United States Patent [19]
Trott

[11] 3,713,086
[45] Jan. 23, 1973

[54] HYDROPHONE

[76] Inventor: Winfield James Trott, 3907 Menlo Drive, Doraville, Ga.

[22] Filed: Sept. 25, 1969

[21] Appl. No.: 861,071

[52] U.S. Cl. .................................340/10, 310/9.5
[51] Int. Cl. ..............................................H04r 17/00
[58] Field of Search ...................340/10; 310/9.5, 9.6

[56] References Cited

UNITED STATES PATENTS

| | | | |
|---|---|---|---|
| 3,320,581 | 5/1967 | Sims | 340/10 |
| 3,444,508 | 5/1969 | Grantors et al. | 340/10 X |
| 3,027,540 | 3/1962 | Howatt | 340/10 |
| 3,051,927 | 8/1962 | Mazzagatti | 340/10 X |
| 3,068,446 | 12/1962 | Ehrlich et al. | 340/10 X |

*Primary Examiner*—Benjamin A. Borchelt
*Assistant Examiner*—R. Kinberg
*Attorney*—Cushman, Darby & Cushman

[57] ABSTRACT

A hydrophone suitable for measuring underwater sound down to the level of the lowest ambient sea noise and at frequencies from approximately 1 Hz to 40 KHz wherein two longitudinally polarized piezo-ceramic tubes with the ends of each acoustically isolated from the sound field are electrically connected in parallel to each other and to the input of a solid state preamplifier housed within the region interior to the tubes. A thin, hollow metal cylinder surrounds the piezo-ceramic tubes, is acoustically coupled to the tubes by a suitable potting compound and forms an acoustically transparent stress member capable of withstanding substantial hydrostatic pressure. As an alternate the stress member can be within the region interior to the tubes and the preamplifier housed at the end of the hydrophone structure.

20 Claims, 2 Drawing Figures

HYDROPHONE

BRIEF DESCRIPTION OF THE PRIOR ART AND SUMMARY OF THE INVENTION

The invention relates to a novel hydrophone for detecting underwater sounds.

Since bodies of water, such as oceans, are highly absorptive to light and other electromagnetic radiation but not to sound waves, acoustics has become increasingly important in transmitting underwater information and in general probing the depths of the seas. Acoustical methods have been found useful in many diverse applications from locating submarines to determining the physical structure of the ocean bottom and organisms found on the bottom of the sea.

Transducer is a term generally used to designate a broad category of devices which are used for the generation and/or reception of underwater sounds. The term projector is commonly applied to a generator of sound, while hydrophone refers to a receiver. Generally, a projector converts electrical energy to motional mechanical energy which is imparted as acoustical waves to a body of water, while a hydrophone converts such waves received as mechanical energy into electrical energy in wave forms which can then be recorded and analyzed.

A number of different ways can be used to accomplish such mechanical-electrical conversion in a hydrophone, and these include electrostriction, magnetostriction and piezoelectricity. The present invention relates to an improved hydrophone design which employs the piezoelectric effect and which is capable of measuring underwater sound down to the level of the lowest ambient sea noise and at frequencies from approximately 1 Hz to 40 KHz. Further, this unique hydrophone, as described below, has a minimum sensitivity to vibration, particularly longitudinal vibrations and cable strumming, and accordingly is especially suitable for positioning along a cable or in a cable in the form of a listening line array. Also this hydrophone, as described below, maximizes the volume of the pressure sensing elements, and hence the sensitivity of the device to acoustical waves, while at the same time minimizes the overall size of the hydrophone, thus reducing production costs and obtaining optimum directionality in comparison to previous devices. This unique hydrophone is particularly useful at moderate depths such as occur on the continental shelf and in other coastal waters.

Hydrophones currently in use, while relatively satisfactory in detecting acoustical waves, have not been totally satisfactory overall. For example, most prior art devices are filled with oil thus increasing manufacturing and construction costs, and most are much longer than necessary, thus increasing machining costs and danger of breakage in service. In others, for example those described in U.S. Pat. No. 3,444,508, polarization of the piezo-ceramic elements is not along a longitudinal direction, and thus they are sensitive to longitudinal vibration. The present invention relates to a hydrophone which is superior to those currently in use and more particularly is less expensive, less sensitive to longitudinal vibrations, more sensitive to low frequency signals and more compact.

The above advantages are obtained by detecting the acoustical waves by means of two longitudinally polarized piezo-ceramic tubes with their ends acoustically isolated from the sound field, and connected in electrical parallel with each other and to the input of a solid state preamplifier which is housed in the space surrounded by the tubes. This arrangement reduces input lead capacitance and minimizes the sensitivity of the active elements to longitudinal vibrations such as cable strumming. Further, a thin metallic cylinder surrounds the ceramic tubes and is acoustically coupled to the ceramic tubes by a suitable potting compound such as polyurethane or silicone resin to form a stress member capable of withstanding considerable hydrostatic pressure while remaining acoustically transparent.

Many other objects and purposes of the invention will become clear from reading the following detailed description of the drawing.

DETAILED DESCRIPTION OF THE DRAWING

Figure 1:
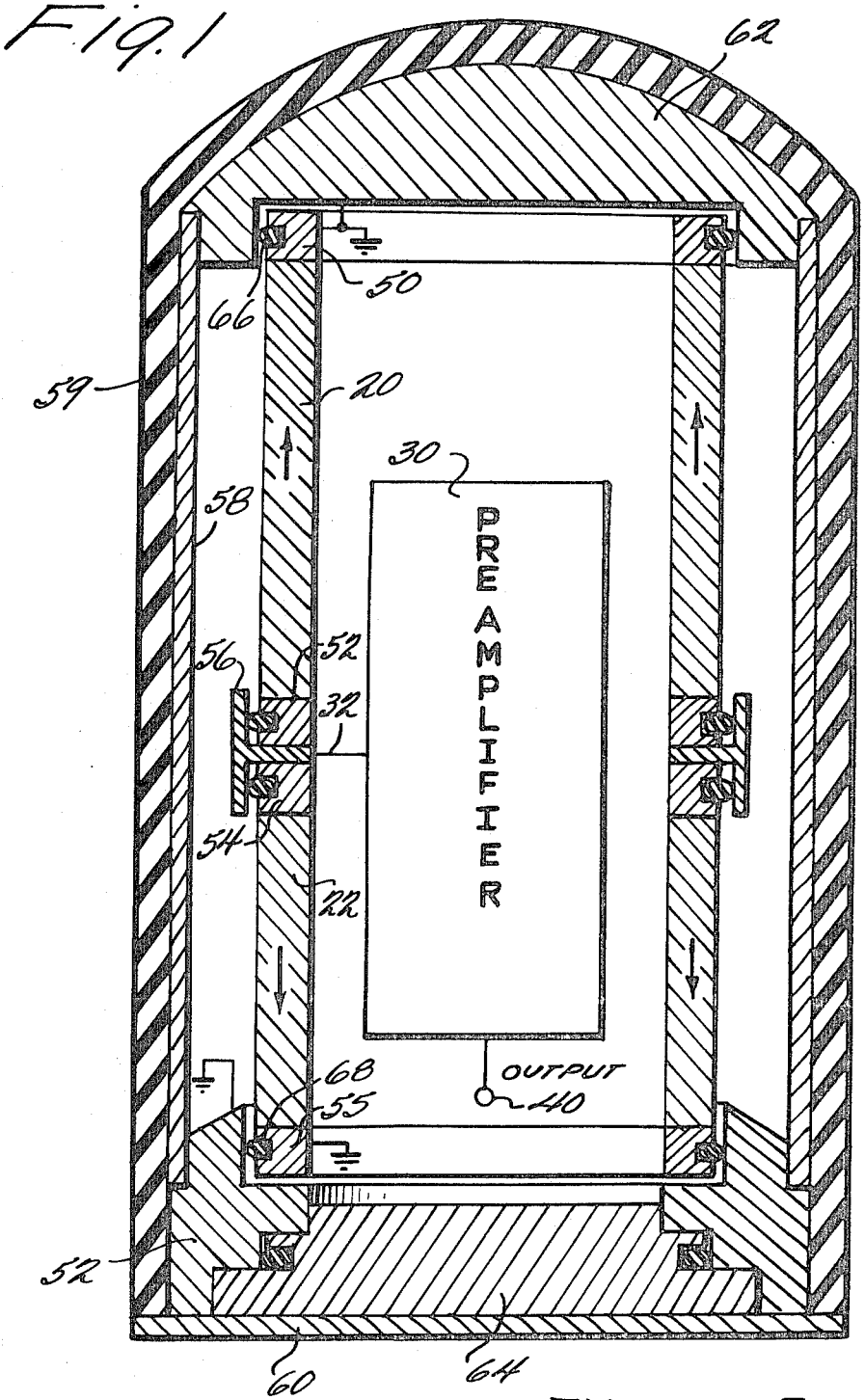
FIG. 1 shows a cut-away view of the novel hydrophone of this invention.

Reference is now made to FIG. 1 which shows a cut-away view of the assembled hydrophone of this invention. As mentioned briefly above, the active elements which actually perform the mechanical-electrical conversion in this arrangement are two longitudinally polarized piezo-ceramic tubes 20 and 22, electrically connected in parallel to each other and mounted with their axes roughly in alignment with an end of each joined together and with their ends acoustically isolated from the sound field. As shown, each tube is polarized oppositely and longitudinally along their cylindrical axes in the directions indicated by the arrows.

The piezoelectric effect is the phenomena which occurs in a number of different crystalline materials whereby the application of a mechanical stress produces an electrical polarization in the material which is proportional to the stress and which manifests itself as a voltage across the crystal, and conversely the application of an electrical voltage between certain faces of the crystal produces mechanical distortion of the material. Because of this ability to perform a mechanical-electrical conversion, such materials are frequently employed in hydrophones as well as other transducers.

Moreover, a few ceramic material including Barium Titanate and a few related compounds also exhibit piezoelectricity when a high D.C. field is applied during the formation of the material to cause polarization along one of the three axes. These materials can be polycrystalline in contrast to other piezoelectric materials which are normally only a single crystal and the advantages of a polycrystalline structure in a hydrophone are apparent. Lead-zirconate-lead titanate, is especially useful and preferably tubes 20 and 22 are comprised of this material.

While no particular size is required for tubes 20 and 22, tubes with a 1 inch diameter, a 1 inch length and a ⅛ inch wall thickness have been shown to work well and to produce suitable electrical signals. This size is near current capabilities for economical commercial manufacture, but larger or smaller tubes can be alternatively used if desired. This size, mounted in the manner shown, has a resonant frequency above 44 KHz and thus without the range of the hydrophone.

The two aligned tubes 20 and 22 then both receive the acoustical vibrations from the acoustically transparent surrounding housing and conventionally respond to such mechanical vibrations by producing electrical signals which can then be used to determine the frequency and amplitude of the mechanical vibrations. The electrical signals thus produced are then passed to a conventional preamplifier unit 30 which is mounted within the space interior to the two tubes 20 and 22. Preamplifier unit 30 is preferably a solid state unit built to yield at least 10 dB margin on sea noise at zero sea state and to produce a free-field voltage sensitivity of −78 dB from a reference of 1 volt/microbar.

As pointed out briefly above, one particular advantage of the arrangement shown in FIG. 1 is that, with the preamplifier unit mounted so closely to the two active elements, the lead line 32 which connects the joinder of tubes 20 and 22 to the preamplifier unit 30 is quite short, thus reducing to a minimum the input lead capacitance to unit 30 which, if substantial, can cause difficulties within the preamplifier unit 30 and reduce the electrical output of unit 30. In an embodiment with 1 inch diameter, 1 inch long tubes 20 and 22, this input capacitance was found to be only 230 pf. and to cause no reduction of the output of unit 30. An output line 40 provides an amplified output signal from the preamplifier unit 30 which can be connected to exterior equipment for conventional processing of the electrical output signal.

Each of the two cylindrical tubes 20 and 22 are capped at both ends by two cylindrical contact rings which are soldered, welded or otherwise affixed to the two piezo-ceramic tubes 20 and 22 as shown. Rings 50 and 52 are attached to tube 20 and rings 54 and 55 to tube 22. Rings 50 and 55 are grounded as shown and rings 52 and 54 are electrically joined by another ring 56 which thus connects tubes 20 and 22 electrically in parallel. The short lead line 32 connects the ring 56 to the preamplifier 30 and thus carries the electrical signals generated by tubes 20 and 22 to unit 30.

As mentioned briefly above, the ends of tubes 20 and 22 not joined together are preferably acoustically isolated from the sound field. In FIG. 1 this is accomplished by supporting the tubes on O-rings 66 and 68 from end cap 62 and end member 52 to shield the ends for greater sensitivity and insulation from vibration.

A metallic cylinder 58 which preferably has a compliance many times that of the ceramic tubes 20 and 22 surrounds tubes 20 and 22 and provides a stress member capable of withstanding considerable hydrostatic pressure. This thin tube 58 preferably is about 0.010 inch thick and is made of aluminum or steel, but a relatively thick walled tube of aluminum can be used for operation of the hydrophone below moderate depths. In the embodiment with 1 inch long tubes 20 and 22, this tube 56 was made 0.01 inch thick with a compliance 56 times that of the tubes 20 and 22. The empty space between the cylinder 58 and the tubes 20 and 22 is preferably filled with a suitable potting compound such as polyurethane or a silicone resin so as to acoustically couple tube 58 to the piezo-ceramic tubes 20 and 22. Further, surrounding the cylinder 58 and sealing the hydrophone is a butyl boot 59 which can be simply slipped over the tube 56 and attached to a conventional bottom 60 in any convenient fashion.

The hydrophone shown in FIG. 1 is preferably assembled as follows. First, the contact rings 50, 52, 54 and 56 are attached to tubes 20 and 22 by any suitable means. Next, the ring 56 joins rings 52 and 54 together, thus aligning tubes 20 and 24 along roughly the same cylindrical axis. This assembly is then slipped into place within the interior of the joined end cap 62, cylinder 56 and member 52. Connections to ground of rings 50 and 55 are now made and the potting material added to the space between tubes 20 and 22 and ring 58. Preamplifier unit 30 can now be slid into place within tubes 22 and 24 and line 32 connected to ring 56 and unit 30. Finally, the plug 64 seals the hydrophone and the butyl boot 59 vacuum expanded and slipped in place, normally with the aid of a lubricant. The bottom 60 is then attached to boot 59.

Figure 2:
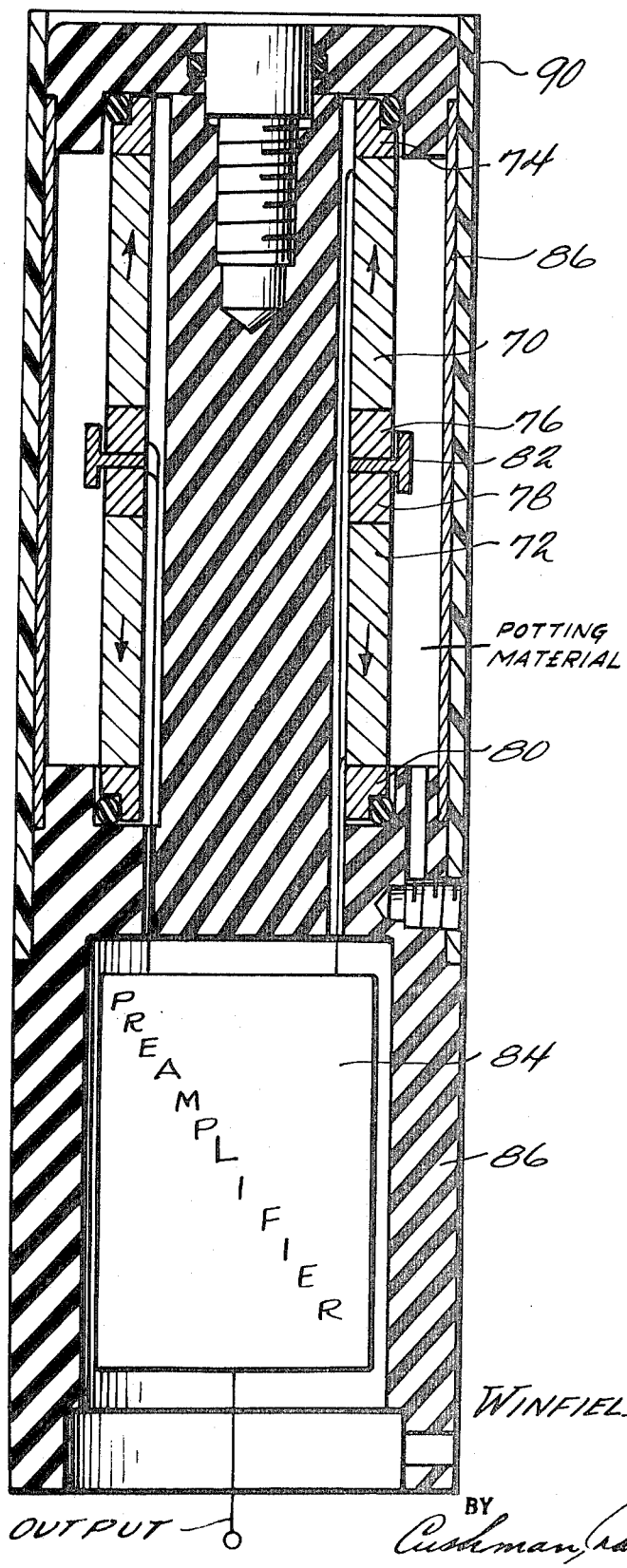
FIG. 2 shows another embodiment of the hydrophone of FIG. 1.

Instead of surrounding the cylindrical piezo-ceramic tubes, the stress member may alternately be mounted within the tubes as shown in FIG. 2. In that drawing, two cylinders 70 and 72, which operate in the same fashion as cylinders 20 and 22, are mounted co-axially within a hydrophone and, like tubes 20 and 22, are capped at both ends by cylindrical contact rings which are soldered, welded or otherwise affixed to tubes 70 and 72. Rings 74 and 76 are attached to tube 70 and rings 78 and 80 attached to tube 72. Another ring 82 connects together the rings 76 and 78 and serves the same function as in the arrangement of FIG. 1. The tubes 70 and 72 are electrically connected to a preamplifier 84 which is mounted below the rings 70 and 72 within the stress member 86. This stress member 86, as can be seen in FIG. 2, also occupies the region interior to the hollow tubes 70 and 72 and performs substantially the same function as the stress member 58 in FIG. 1. A shield 86 which may be of any suitable material is also provided exterior to the tube 70 and 72 and preferably the space between the tubes 70 and 72 and the cylindrical shield member 86 is filled with a suitable potting compound such as polyurethane. A butyl polyurethane or other boot 90 is also slipped over the area exterior to the shield 86 as in the arrangement of FIG. 1.

As discussed briefly above, this improved design then has a number of advantages not possible with conventional hydrophones. Not only is the cost of this design significantly reduced and the design size rendered much more compact, but optimum directionality is obtained and minimum sensitivity to vibration. Accordingly, this novel design is particularly suitable for positioning along a cable as a listening line array. The short lead length obtained by mounting the preamplifier within the two piezo-ceramic cylinders has been found to substantially reduce the input capacitance to the preamplifier unit. Further, employing as the active elements two piezo-ceramic cylinders which are polarized along their cylindrical axis substantially reduces sensitivity of the hydrophone to cable strumming.

It should be apparent that many changes and modifications of the structure shown in FIG. 1 can be made without departing from the spirit of the invention. While it is contemplated that the hydrophone shown in FIG. 1 will be simply attached at one end to a cable, it can, if desired, be built into the cable as a line array. In such a line array the conductors can be passed through the hydrophone via the potting compound or within the tubes 20 and 22. Accordingly, the scope of the invention is intended to be limited only by the scope of the appended claims.

What is claimed is:

1. A hydrophone comprising:
   a first cylindrical tube of piezo-ceramic material, polarized along the axis of the tube, and having an outer cylindrical surface for receiving acoustical signals and producing electrical signals containing information related to said acoustical signals, and
   housing means for supporting and containing said tube so that said acoustical signals are received at least by said outer cylindrical surface of said first tube.

2. A hydrophone comprising:
   a first cylindrical tube of piezo-ceramic material, polarized along the axis of the tube, for receiving acoustical signals and producing electrical signals containing information related to said acoustical signals, and
   housing means for supporting and containing said member, and for acoustically isolating at least one of the ends of said first tube.

3. A hydrophone as in claim 1 including a second cylindrical tube of piezo-ceramic material, polarized along the axis of said second tube, for also receiving said acoustical signals and producing electrical signals containing information related to said acoustical signals, said housing means supporting said second tube along roughly the same cylindrical axis as said first tube.

4. A hydrophone as in claim 3 wherein said first tube is attached by a first sound insulating ring to an upper supporting means for supporting said first tube and said second tube is attached by a second sound insulating ring to a lower supporting means for supporting said second tube.

5. A hydrophone comprising:
   a first cylindrical tube of piezo-ceramic material, polarized along the axis of the tube, for receiving acoustical signals and producing electrical signals containing information related to said acoustical signals,
   housing means for supporting and containing said member,
   a second cylindrical tube of piezo-ceramic material, polarized along the axis of said second tube in a direction opposite to the direction of polarization of said first tube, for also receiving said acoustical signals and producing electrical signals containing information related to said acoustical signals, said housing means supporting said second tube along roughly the same cylindrical axis as said first tube,
   means for electrically connecting at least one end of said first and second tubes and for connecting said first and second tubes in parallel.

6. A hydrophone as in claim 5 wherein said first and second tubes are hollow and further including amplifier circuit means mounted within the interior of said first and second tubes and electrically connected to said tubes for receiving and amplifying said electrical signals.

7. A hydrophone as in claim 5 including electrical contact rings connected to each end of said first and second tubes and wherein two of said rings are electrically connected together to join said rings and two of said rings are grounded.

8. A hydrophone comprising:
   a first cylindrical tube of piezo-ceramic material, polarized along the axis of the tube, for receiving acoustical signals and producing electrical signals containing information related to said acoustical signals,
   housing means for supporting and containing said member, and
   a cylindrical metallic tube surrounding said first tube for providing a stress member and being substantially transparent to said acoustical waves.

9. A hydrophone as in claim 1 wherein said piezo-ceramic material is lead titanate lead zirconate.

10. A hydrophone as in claim 3 wherein said first and second tubes are approximately 1 inch in outside diameter, 1 inch in length and one-eighth inch in wall thickness.

11. A hydrophone as in claim 1 further including a stress member mounted in the space interior to said tube.

12. A hydrophone as in claim 11 wherein said stress member has a hollow region in the area below said tube and including preamplifier means mounted in said hollow region for receiving said electrical signals.

13. A hydrophone as in claim 8 including a potting material between said metallic tube and said first and second tubes for coupling said first and second tubes to said metallic tube.

14. A hydrophone as in claim 13 further including a butyl boot exterior to said metallic tube.

15. A hydrophone comprising:
   a first cylindrical tube of piezo-ceramic material, polarized along the axis of said first tube and having an outer cylindrical surface for receiving acoustical signals and producing electrical signals containing information related to said acoustical signals,
   a second cylindrical tube of piezo-ceramic material, polarized along the axis of said second tube and having an outer cylindrical surface for also receiving said acoustical signals and producing electrical signals containing information related to said acoustical signals,
   means for mounting said first and second tubes so that an end of each is joined together, so that said first and second tubes are disposed with roughly the same cylindrical axis so that said acoustical signals are received at least by said outer cylindrical surfaces of said first and second cylindrical tubes and so that said first and second tubes are connected electrically in parallel with each other,
   a third cylindrical tube surrounding said first and second tubes and substantially acoustically transparent to said acoustical waves, and
   means coupling said third tube to said first and second tubes.

16. A hydrophone comprising:

a first cylindrical tube of piezo-ceramic material, polarized along the axis of said first tube, for receiving acoustical signals and producing electrical signals containing information related to said acoustical signals, a second cylindrical tube of piezo-ceramic material, polarized along the axis of said second tube, for also receiving said acoustical signals and producing electrical signals containing information related to said acoustical signals, means for mounting said first and second tubes so that an end of each is joined together, so that said first and second tubes are disposed with roughly the same cylindrical axis and so that said first and second tubes are connected electrically in parallel with each other, a third cylindrical tube surrounding said first and second tubes and substantially acoustically transparent to said acoustical waves, means coupling said third tube to said first and second tubes and means for acoustically isolating the ends of said first and second tubes not joined together from the sound field.

17. A hydrophone as in claim 15 wherein said first and second tubes are hollow and including preamplifier means disposed within said first and second tubes for receiving and amplifying said electrical signals.

18. A hydrophone as in claim 15 including flexible covering means for covering said third tube.

19. A hydrophone as in claim 15 wherein said coupling means is a potting material.

20. A hydrophone comprising:

a first cylindrical tube of piezo-ceramic material, polarized along the axis of said first tube and having an outer cylindrical surface for receiving acoustical signals and producing electrical signals containing information related to said acoustical signals, a second cylindrical tube of piezo-ceramic material, polarized along the axis of said second tube and having an outer cylindrical surface for also receiving said acoustical signals and producing electrical signals containing information related to said acoustical signals, means for connecting said first and second tubes electrically in parallel with each other, means for mounting said first and second tubes so that their axes are substantially in alignment and so that acoustical signals are received at least by said outer cylindrical surfaces of said first and second cylindrical tubes, preamplifier circuit means mounted within said first and second tubes, and means for connecting said first and second tubes to said preamplifier means so that said electrical signals are passed to said preamplifier means.

* * * * *